United States Patent [19]
Coleman

[11] Patent Number: 5,934,702
[45] Date of Patent: Aug. 10, 1999

[54] HORN SWITCH FOR AIR BAG MODULE

[75] Inventor: Daniel E. Coleman, Mesa, Ariz.

[73] Assignee: Trw Inc., Lyndhurst, Ohio

[21] Appl. No.: 08/811,335

[22] Filed: Mar. 4, 1997

[51] Int. Cl.⁶ .................................................. B60R 21/22
[52] U.S. Cl. .................. 280/731; 200/61.54; 200/61.55; 280/728.3
[58] Field of Search .............................. 280/728.1, 728.3, 280/731; 200/61.54, 61.55

[56] References Cited

U.S. PATENT DOCUMENTS

| | | |
|---|---|---|
| 5,157,372 | 10/1992 | Langford . |
| 5,198,629 | 3/1993 | Hayashi et al. .................... 280/731 |
| 5,269,559 | 12/1993 | Filion et al. . |
| 5,309,135 | 5/1994 | Langford . |
| 5,398,962 | 3/1995 | Kropp . |
| 5,465,998 | 11/1995 | Davis .................................. 200/61.54 |
| 5,539,259 | 7/1996 | Filion et al. . |

FOREIGN PATENT DOCUMENTS

| | | | |
|---|---|---|---|
| 3-143751 | 6/1991 | Japan ..................................... | 280/731 |
| 4-163255 | 6/1992 | Japan ................................. | 280/728.3 |

*Primary Examiner*—Eric D. Culbreth
*Attorney, Agent, or Firm*—Tarolli, Sundheim, Covell Tummino & Szabo

[57] ABSTRACT

A vehicle safety apparatus (10) includes an inflatable vehicle occupant protection device (40) and an inflator (30). A cover (70) includes first and second cover parts (78, 80) releasably interconnected by a rupturable portion (82) of the cover. The cover (70) is movable from a closed condition to an open condition in which the rupturable portion (82) of the cover is ruptured and the first and second cover parts (78, 80) are spaced apart from each other to enable inflation of the inflatable device. An electric current carrying structure (100) is operable to actuate an electrically actuatable device (102) of the vehicle. The structure (100) includes first and second parts (140, 142) releasably interconnected by a rupturable portion (144) of the structure. The structure (100) is molded into the cover (70). The rupturable portion (82) of the cover overlies the rupturable portion (144) of the structure. The structure (100) comprises a substrate (120) and an electrically conductive, variable resistance material (110) on the substrate. The resistance of the variable resistance material (110) is variable in response to force applied to the cover (70) by the vehicle occupant to deform the cover. The first part (140) of the structure (100) is movable with the first cover part (78) from the closed condition to the open condition and the second part (142) of the structure (100) is movable with the second cover part (80) from the closed condition to the open condition.

4 Claims, 3 Drawing Sheets

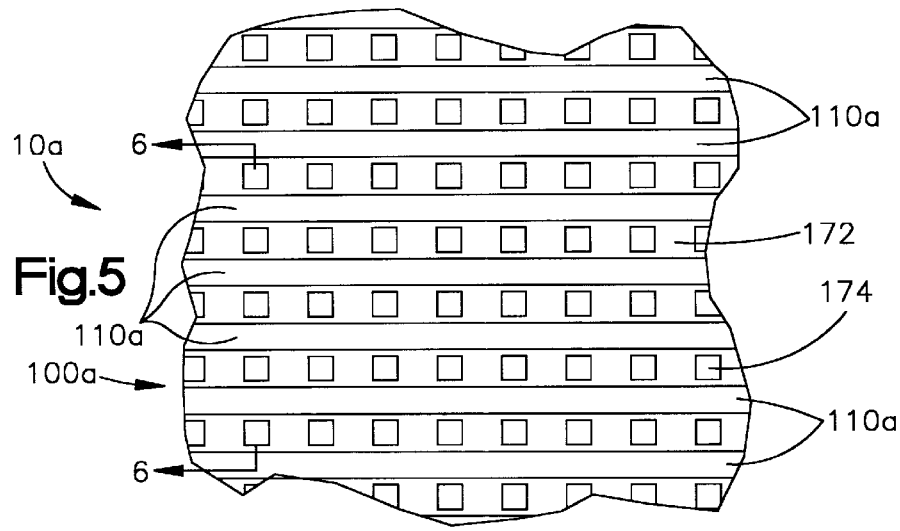
Fig.5
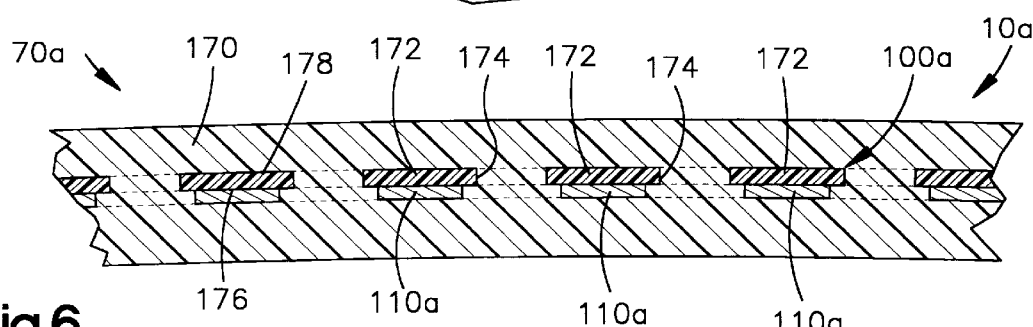
Fig.6
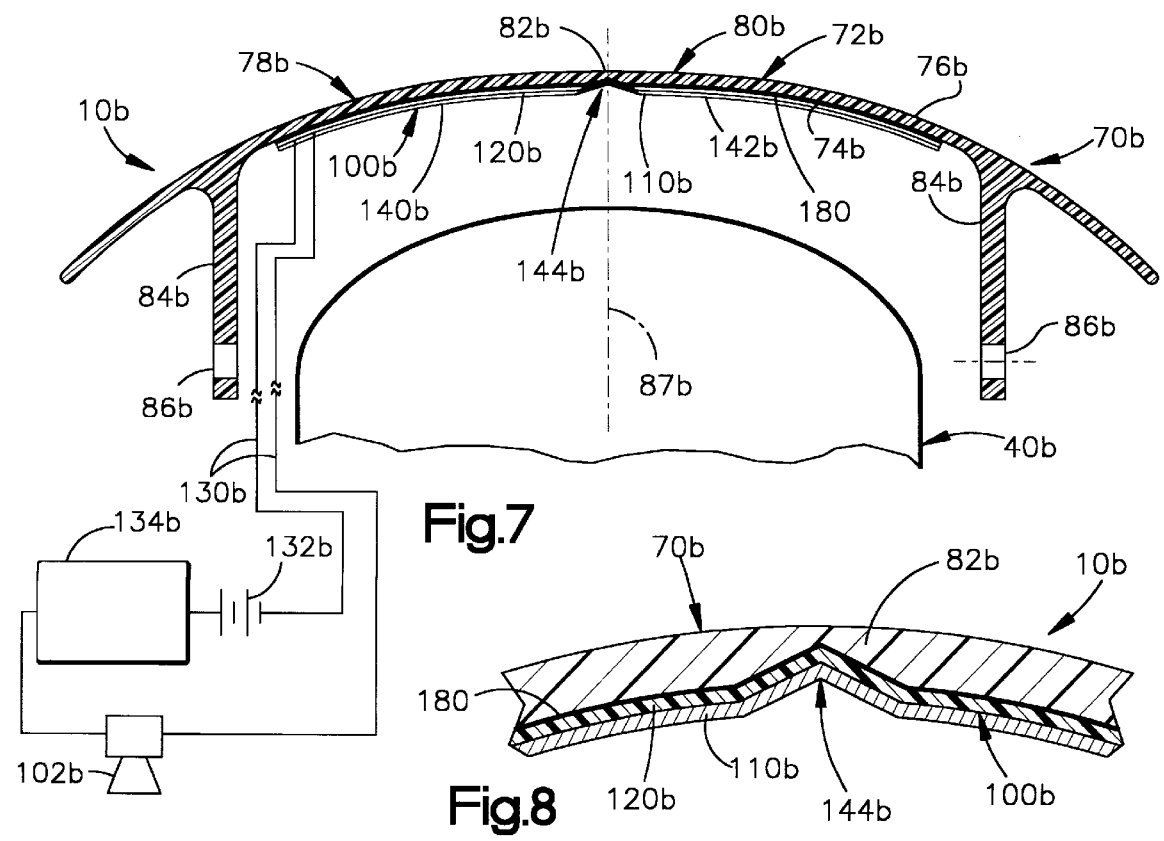
Fig.7
Fig.8

– 5,934,702 –

HORN SWITCH FOR AIR BAG MODULE

BACKGROUND OF THE INVENTION

1. Technical Field

The present invention relates to a switch for mounting on a portion of a vehicle as part of a vehicle safety apparatus. In particular, the present invention relates to a horn switch which is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch which is operable by pressing on a cover of an air bag module mounted on a vehicle steering wheel. U.S. Pat. No. 5,309,135 discloses a horn switch which includes a variable resistance conductor adhered to a flexible substrate and attached to an air bag module cover.

SUMMARY OF THE INVENTION

The present invention is a vehicle safety apparatus for helping to protect an occupant of a vehicle. The apparatus includes an inflatable vehicle occupant protection device and an inflator actuatable to provide inflation fluid for inflating the inflatable device from a deflated condition to an inflated condition. The inflator and the inflatable device are supported on a portion of the vehicle. The apparatus includes a cover including first and second cover parts releasably interconnected by a rupturable portion of the cover. The cover has a closed condition in which the first and second cover parts enclose the inflatable device when the inflatable device is in the deflated condition. The cover is movable, due to the force of inflation of the inflatable device, from the closed condition to an open condition in which the rupturable portion of the cover is ruptured and the first and second cover parts are spaced apart from each other to enable inflation of the inflatable device. The apparatus includes an electric current carrying structure operable to actuate an electrically actuatable device of the vehicle. The structure includes first and second parts which are releasably interconnected by a rupturable portion of the structure. The structure is molded into the cover, and the rupturable portion of the cover overlies the rupturable portion of the structure. The structure comprises a substrate and an electrically conductive, variable resistance material on the substrate. The resistance of the variable resistance material is variable in response to force applied to the cover by the vehicle occupant to deform the cover. The first part of the structure is movable with the first cover part from the closed condition to the open condition and the second part of the structure is movable with the second cover part from the closed condition to the open condition.

In another embodiment, the structure is adhered to a surface of the cover facing the inflatable device. In a further embodiment, the cover is molded from a plastic material and includes a reinforcing scrim molded into the plastic material. The variable resistance material is disposed on the reinforcing scrim and is molded into the cover with the reinforcing scrim.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a plan view of a portion of a switch constructed in accordance with a second embodiment of the present invention;

FIG. 6 is a view similar to FIG. 2 of a portion of the switch of FIG. 5 molded into a cover of an air bag module;

FIG. 7 is a view similar to FIG. 1 showing parts of an air bag module including a horn switch and constructed in accordance with a third embodiment of the present invention; and FIG. 8 is an enlarged sectional view of a portion of the cover and switch of FIG. 7.

DESCRIPTION OF PREFERRED EMBODIMENTS

Figure 1:
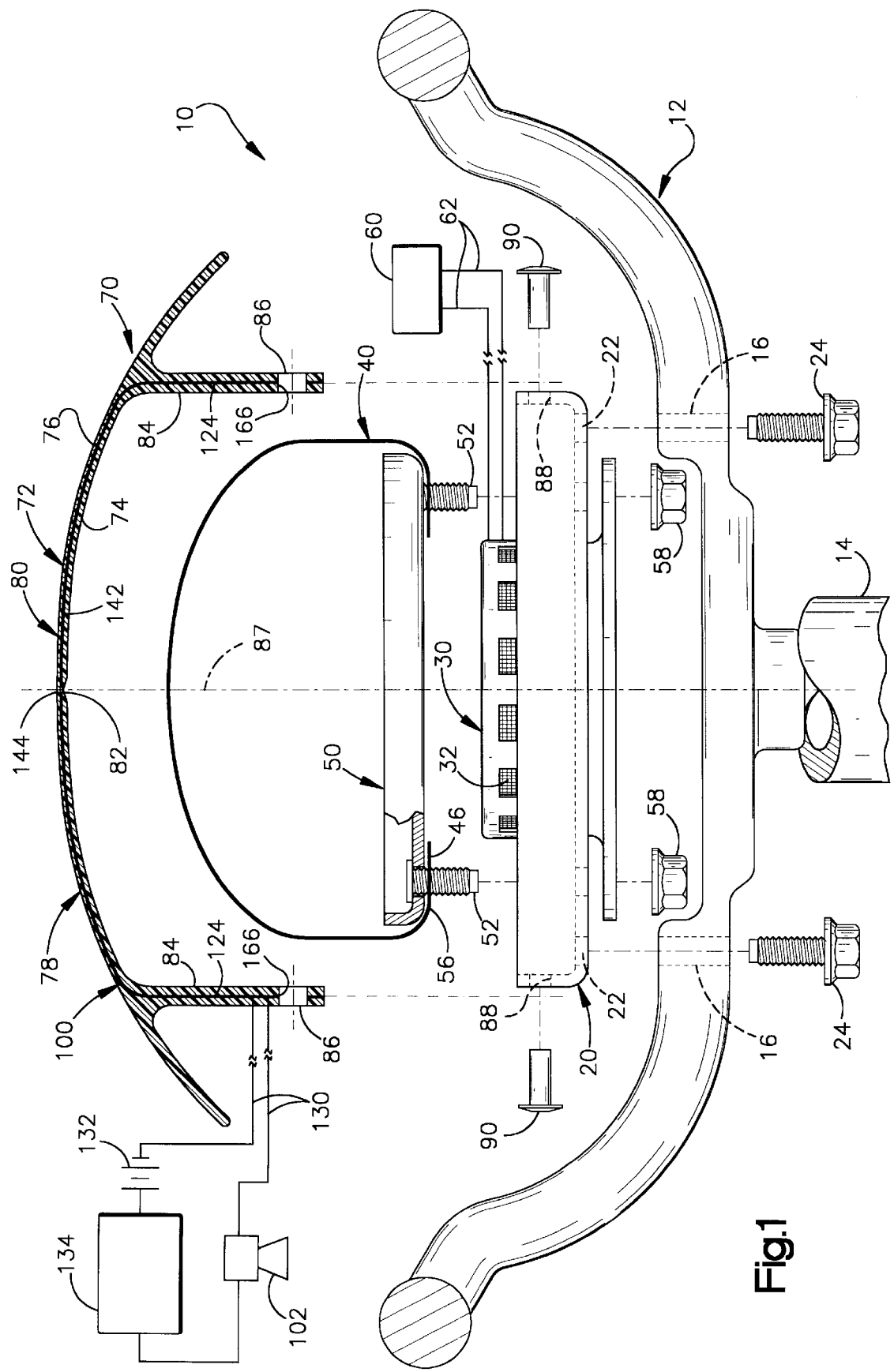
FIG. 1 is a schematic view, partially in section, showing a horn switch molded into a cover of an air bag module mounted on a vehicle steering wheel.

The present invention relates to a vehicle safety apparatus including a switch. In particular, the present invention relates to an air bag module which includes a switch for an electrically actuatable device of a vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a plastic material which is strong enough to protect the parts of the air bag module 10 which are enclosed within the cover. The material of the cover 70 is sufficiently flexible or deformable so that it can be resiliently deformed inwardly (that is, in a downward direction as viewed in FIG. 1) by pressure from an occupant of the vehicle, so as to actuate an electrical device of the vehicle such as the vehicle horn. Suitable materials include Hytrel (trademark) plastic from E. I. DuPont de Nemours & Co. of Wilmington, Del., and Santoprene (trademark) plastic from Monsanto Company of St. Louis, Mo.

The cover 70 has a main body portion 72 which has inner and outer side surfaces 74 and 76. The main body portion 72 of the cover 70 includes first and second cover parts 78 and 80 separated by an elongate tear seam 82 of the cover. The tear seam 82 constitutes a weakened portion of the cover 70 which is rupturable under the force of the inflating air bag 40 to enable the cover parts 78 and 80 to move away from each other so that the air bag can inflate out of the cover.

In the illustrated embodiment, the tear seam 82 is formed by a pair of surfaces 83 and 85 (FIG. 2) which extend from the inner side surface 74 of the cover 70 in a direction toward the outer side surface 76 of the cover, so that the cover is thinner at the location of the tear seam. The surfaces 83 and 85 intersect at an axis 87 of the module 10.

A mounting flange or mounting portion 84 (FIG. 1) of the cover 70 extends from the main body portion 72 in a direction toward the base plate 20. A plurality of first fastener openings 86 are formed in the mounting portion 84 of the cover 70.

The air bag module 10 includes a structure 100 for actuating an electrically actuatable device of the vehicle, such as a vehicle horn 102. In the preferred embodiment, the structure 100 is a flexible, sheet material, single layer variable potentiometer switch which includes a layer of electrically conductive, variable resistance material 110 (FIG. 2) screen printed onto a substrate 120. The switch 100 is generally of the type shown in U.S. Pat. Nos. 5,157,372 and 5,309,135 and available from Flexpoint, Inc., 6906 South 300 West, Midvale, Utah 84047. The switch 100 is molded into the cover 70 as described below.

The substrate portion 120 of the switch 100 is an electrically insulating material which is tear resistant and die cuttable. The material of the substrate 120 is able to conform to compound curves and retain the variable resistance material 110. A preferred material for the substrate 120 is Kapton (trademark) polyimide film which is available from DuPont.

Other suitable materials include Mylar (trademark) film which is available from DuPont, and Melinex (trademark) polyester film which is available from Imperial Chemical Industries of London, England. The substrate 120 preferably has a thickness of about 1 mil.

Figure 4:
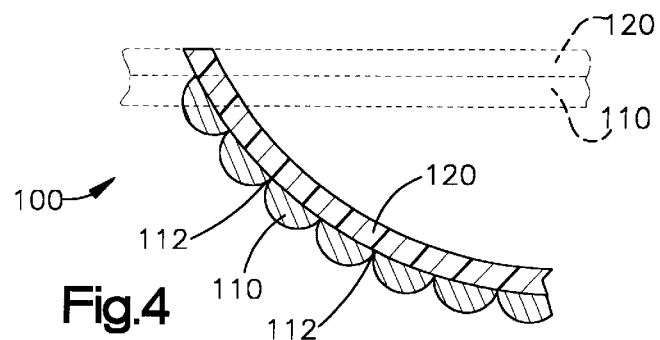
FIG. 4 is an enlarged schematic view showing parts of the switch in different positions.

The variable resistance material 110 is a material whose electrical conductivity varies when the material is deformed in one direction only. The preferred variable resistance material 110 is a graphite based ink which develops fissures or cracks (shown schematically at 112 in FIG. 4) when bent. The cracks 112, it is believed, increase the electrical resistance of the ink. The resistance of the variable resistance material 110 increases only when the switch 100 is bent or deformed by force exerted in a downward direction as viewed in FIG. 1. The resistance of the variable resistance material 110 does not increase when the switch 100 is bent or deformed by force exerted in an upward direction as viewed in FIG. 1.

Figure 2:
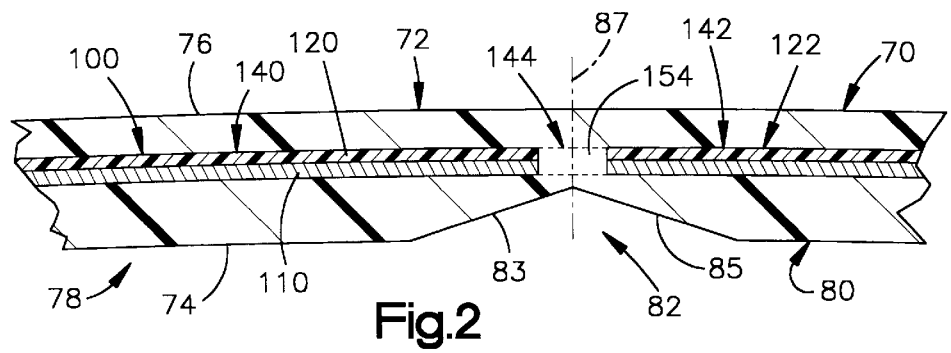
FIG. 2 is an enlarged sectional view of a portion of the cover and switch of FIG. 1.

The variable resistance material 110 (FIG. 2) covers only a portion of the substrate 120. Specifically, the switch 100 has an active portion 122 located between a pair of inactive portions 124. The active portion 122 of the switch 100 is that part of the switch which is exposed to force from the vehicle occupant pressing on the cover 70 of the air bag module 10 to operate the switch. In the active portion of the switch 100, a layer of the variable resistance material 110 is deposited on the substrate 120. The variable resistance material 110 is deposited, preferably in a grid pattern as shown in FIG. 2, so as to form a variable resistance conductor between a pair of conductive traces 126 and 128.

A pair of lead wires 130 (FIG. 1) or other known type of electrical conductor are electrically connected with the conductive traces 126 and 128 on the switch 100. The lead wires 130 connect the horn switch 100 with the vehicle horn 102, with a power source 132 such as the vehicle battery, and with vehicle electric circuitry indicated schematically at 134.

Figure 3:
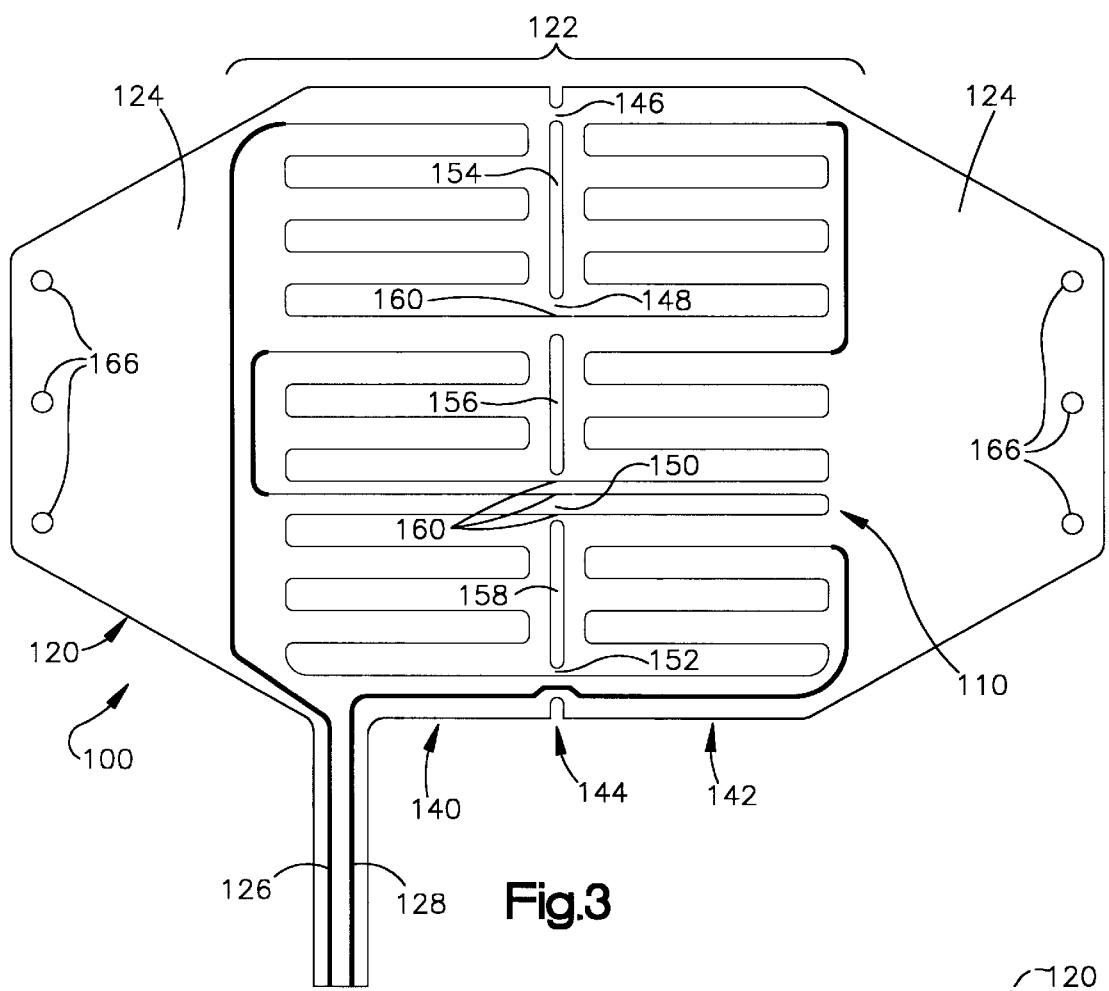
FIG. 3 is a plan view of the switch of FIG. 1.

The switch 100 (FIG. 3) includes first and second switch parts 140 and 142 which are separated by an elongate tear seam or rupturable portion 144 of the switch. The tear seam 144 includes a linear series of connector sections 146, 148, 150 and 152 separated by a series of elongate slots 154, 156 and 158. The connector sections 146–152 extend between and interconnect the first and second switch parts 140 and 142. The number, length, and spacing of the connector sections 146–152 and of the slots 154–158 may be varied to control the amount of force needed to rupture the rupturable portion 144 of the switch 100.

The rupturable portion 144 of the switch 100 forms a stress riser in the switch. Specifically, the rupturable portion 144 of the switch 100 is a predetermined weakened portion of the switch which is rupturable under less force than is needed to rupture other, surrounding, portions of the switch. This area of predetermined weakness, or stress riser, in the switch 100 results from the presence of the slots 154–158. As a result, upon inflation of the air bag 40, the switch 100 opens, in a predetermined manner, at the rupturable portion 144 rather than at any other location.

The two inner connector sections 148 and 150 of the switch 100 are active—that is, portions 160 of the electrically conductive, variable resistance material 110 are located on each one of the connector sections 148 and 150. As a result, when force is transmitted through the cover 70 to one of the connector sections 148 and 150, the resistance of the switch 100 varies. These two connector sections 148 and 150 are located at or near the center of the vehicle steering wheel 12 when the switch 100 is installed in the air bag module 10, so as to receive force when the vehicle occupant presses at or near the center of the cover 70 to sound the horn 102.

The switch 100 is molded into the plastic material of the cover 70 during manufacture of the cover. The layer of conductive material 110 is presented toward the inner side surface 74 of the cover 70. The substrate 120 is presented toward the outer side surface 76 of the cover 70.

The active portion 122 of the switch 100 is located in the main body portion 72 of the cover 70. The first switch part 140 is molded into the first cover part 78. The second switch part 142 is molded into the second cover part 80.

The tear seam 144 in the switch 100 is aligned with the tear seam 82 in the cover 70. Specifically, the elongate tear seam 82 (FIG. 2) in the cover 70 overlies and extends parallel to the elongate tear seam 144 in the switch 100. Both the tear seam 82 in the cover 70 and the tear seam 144 in the switch 100 are located on the axis 87 of the module. The plastic material of the cover 70 flows into the slots 154, 156 and 158 of the tear seam 144 of the switch 100 during molding of the cover.

The inactive portions 124 of the switch 100 are located in the mounting portion 84 of the cover. Fastener openings 166 in the inactive portions 124 of the switch 100 are aligned with the fastener openings 86 in the mounting portion 84 of the cover 70.

When the switch 100 is assembled on the module 10, rivets 90 extend through the openings 86 in the cover 70 and through the fastener openings 166 in the switch 100. The inactive portions 124 of the switch are secured, by the rivets 90 and the mounting portion 84 of the cover 70, to the base plate 20.

To effect operation of the vehicle horn 102, the driver of the vehicle presses on the cover 70 of the air bag module 10 in a downward direction as viewed in FIG. 1. The force applied to the cover 70 of the air bag module 10 is transmitted through the deformable plastic material of the cover to the switch 100.

The switch 100 deforms under the force applied to the cover 70. When the switch 100 deforms, the electrical resistance of the conductive material 110 increases. This change in the resistance of the switch 100 is sensed by the vehicle electric circuitry 134. The vehicle horn 102 is energized.

When the force on the cover 70 of the air bag module 10 is released, the resilience of the cover 70 causes it to move away from the air bag 40. As this movement occurs, the switch 100 returns to its original, undeformed condition. The electrical resistance of the conductive material 110 returns to its first level. This change in the resistance of the switch 100 is sensed by the vehicle electric circuitry 134. The vehicle horn 102 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1, generally parallel to the axis 87 of the module 10.

The force of the inflating air bag 40 is applied against the inside of the cover 70. Specifically, the inflating air bag 40 contacts the inner side surface 74 of the main body portion 72 of the cover 70, on both the first cover part 78 and the second cover part 80.

The force of the inflating air bag 40 tends to open the cover 70 to allow the air bag to inflate out of the cover. The cover 70 opens at the rupturable portion 82, which is the predetermined weakened portion of the cover. The rupturable portion 82 breaks, and the first and second cover parts 78 and 80 move away from each other into an open condition (not shown). The cover 70 opens sufficiently that the air bag 40 inflates between the first and second cover parts 78 and 80 into a position to help protect the vehicle occupant.

When the cover 70 opens, the switch 100 opens at the rupturable portion 144, which is the predetermined weakened portion of the switch. The connector sections 146–152 of the rupturable portion 144 break. The first and second switch parts 140 and 142 to move away from each other. Specifically, the first switch part 140 moves with the first cover part 78, and the second switch part 142 moves with the second cover part 80. The mounting portion 84 of the cover 70, which is clamped to the retaining ring 50, keeps the cover parts 78 and 80 and the switch parts 140 and 142 from moving away from the air bag module 10 into the interior of the vehicle.

The switch 100 could be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

FIGS. 5 and 6 illustrate portions of an air bag module 10a which is constructed in accordance with a second embodiment of the present invention. The air bag module 10a is generally similar in construction and mode of operation to the air bag module 10. Parts of the air bag module 10a which are similar or identical to parts of the air bag module 10 are given the same reference numeral with the suffix "a" added for clarity.

In the air bag module 10a, the cover 70a is molded from a relatively low tensile strength material 170, such as urethane foam, which needs to be reinforced to have the strength desired for the finished product. It is typical in such covers for a reinforcing member, called a "scrim", to be molded into the material of the cover. In the air bag module 10a, a scrim 172 is used both as the reinforcing member and as the carrier, or substrate, for the conductive material 110a of the switch 100a.

The scrim 172 is a sheet of relatively rigid injection molded plastic, such as thermoplastic polyolefin, about one millimeter thick. A plurality of square openings 174 extend between first and second opposite major side surfaces 176 and 178 of the scrim 172. The scrim 172 has a relatively thin area (not shown) which provides an elongate tear seam or rupturable portion of the switch 100a. The tear seam of the switch 100a is aligned with the tear seam (not shown) of the cover 70a.

The electrically conductive material 110a of the switch 100a is disposed on the first major side surface 176 of the scrim 172. In the embodiment illustrated in FIGS. 5 and 6, the electrically conductive material 110a is in the form of lines of conductive material extending between rows of the openings 174 in the scrim 172. Alternatively, the electrically conductive material 110a could be disposed in other configurations on the scrim 172.

During molding of the cover 70a, the plastic material 170 of the cover flows through the openings 174 in the scrim 172 to encase the switch 100a. The plastic material 170 then hardens to form the finished cover 70a. The scrim 172 is locked in position in the cover 70a by the plastic material 170 in the openings 174, and also by the adherence of the plastic material to the conductive material 110a and to the second major side surface 178 of the scrim 172.

Once the switch 100a is assembled in the air bag module 10a, the switch functions in the same manner as the switch 100 of the air bag module 10. Specifically, the switch 100a is actuated in the same manner as the switch 100 of the air bag module 10. The air bag is inflatable through the tear seam (not shown) of the switch 100a in the same manner as the air bag 40 is inflatable through the tear seam of the switch 100.

FIGS. 7 and 8 illustrate portions an air bag module 10b which is constructed in accordance with a second embodiment of the present invention. The air bag module 10b is generally similar in construction and mode of operation to the air bag module 10. Parts of the air bag module 100b which are similar or identical to parts of the air bag module 10 are given the same reference numeral with the suffix "b" added for clarity.

The air bag module 10b includes a horn switch 10b. The horn switch 100b is similar in configuration to the switch 100 (FIG. 1). Specifically, the switch 100b (FIGS. 7 and 8) includes a layer of variable resistance, electrically conductive material 110B on a flexible substrate 120b. Substantially the entire switch 100b is active. The switch 100b does not have inactive portions of any substantial size.

The switch 100b is adhered to the inner side surface 74b of the main body portion 72b of the cover 70b with a suitable adhesive 180. The layer of conductive material 110b is presented toward the air bag 40b. The substrate 120b is presented toward the cover 70b. The switch 100b is thus disposed between the outside of the air bag 40b and the inside of the cover 70b.

The first switch part 140b is adhered to the first cover part 78b, and the second switch part 142b is adhered to the second cover part 80b. The tear seam 144b in the switch 100b is aligned with the tear seam 82b in the cover 70b. Specifically, the tear seam 82b (FIG. 2) in the cover 70b overlies and extends parallel to the tear seam 144b in the switch 100b. Both the tear seam 82b in the cover 70b and the tear seam 144b in the switch 100b are located on the axis 87b of the module 10b.

Once the switch 100b is assembled in the air bag module 100b, the switch functions in the same manner as the switch 100 of the air bag module 10. Specifically, the switch 100b is actuated in the same manner as the switch 100 of the air bag module 10. The air bag 40b is inflatable through the tear seam of the switch 100b in the same manner as the air bag 40 is inflatable through the tear seam of the switch 100.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, I claim:

1. A vehicle safety apparatus for helping to protect an occupant of a vehicle, said apparatus comprising:

an inflatable vehicle occupant protection device having a deflated condition and being inflatable into an inflated condition adjacent to the vehicle occupant;

an inflator actuatable to provide inflation fluid for inflating said inflatable device from the deflated condition to the inflated condition;

support means for supporting said inflator and said inflatable device on a portion of the vehicle;

a cover including first and second cover parts releasably interconnected by a rupturable portion of said cover;

said cover having a closed condition in which said first and second cover parts enclose said inflatable device when said device is in the deflated condition;

said cover being movable, due to the force of said inflatable device, from the closed condition to an open condition in which said rupturable portion of said cover is ruptured and said first and second cover parts are spaced apart from each other to enable inflation of said inflatable device; and an electric current carrying structure operable to actuate an electrically actuatable device of the vehicle, said structure including first and second parts which are releasably interconnected by a rupturable portion of said structure;

said structure being molded into said cover, said rupturable portion of said cover overlying said rupturable portion of said structure;

said structure comprising a substrate and an electrically conductive, variable resistance material on said substrate, the resistance of said variable resistance material being variable in response to force applied to said cover by the vehicle occupant to deform said cover;

said first part of said structure being movable with said first cover part from the closed condition to the open condition and said second part of said structure being movable with said second cover part from the closed condition to the open condition;

said rupturable portion of said structure comprising a series of connector sections separated by a series of slots, said connector sections extending between and interconnecting said first and second parts of said structure;

a portion of said electrically conductive, variable resistance material being located on at least one of said connector sections, the resistance of said variable resistance material being variable in response to force applied to said at least one connector section by the vehicle occupant.

2. A vehicle safety apparatus for helping to protect an occupant of a vehicle, said apparatus comprising:

an inflatable vehicle occupant protection device having a deflated condition and being inflatable into an inflated condition adjacent to the vehicle occupant;

an inflator actuatable to provide inflation fluid for inflating said inflatable device from the deflated condition to the inflated condition;

support means for supporting said inflator and said inflatable device on a portion of the vehicle;

a cover including first and second cover parts releasably interconnected by a rupturable portion of said cover;

said cover having a closed condition in which said first and second cover parts enclose said inflatable device when said device is in the deflated condition;

said cover being movable, due to the force of said inflatable device, from the closed condition to an open condition in which said rupturable portion of said cover is ruptured and said first and second cover parts are spaced apart from each other to enable inflation of said inflatable device; and an electric current carrying structure operable to actuate an electrically actuatable device of the vehicle, said structure including first and second parts which are releasably interconnected by a rupturable portion of said structure;

said structure being adhered to a surface of said cover facing said inflatable device, said rupturable portion of said cover overlying said rupturable portion of said structure;

said structure comprising a substrate and an electrically conductive, variable resistance material on said substrate, the resistance of said variable resistance material being variable in response to force applied to said cover by the vehicle occupant to deform said cover;

said first part of said structure being movable with said first cover part from the closed condition to the open condition and said second part of said structure being movable with said second cover part from the closed condition to the open condition;

said rupturable portion of said structure comprising a series of connector sections separated by a series of slots, said connector sections extending between and interconnecting said first and second parts of said structure;

a portion of said electrically conductive, variable resistance material being located on at least one of said connector sections, the resistance of said variable resistance material being variable in response to force applied to said at least one connector section by the vehicle occupant.

3. A vehicle safety apparatus for helping to protect an occupant of a vehicle, said apparatus comprising:

an inflatable vehicle occupant protection device having a deflated condition and being inflatable into an inflated condition adjacent to the vehicle occupant;

an inflator actuatable to provide inflation fluid for inflating said inflatable device from the deflated condition to the inflated condition;

support means for supporting said inflator and said inflatable device on a portion of the vehicle;

a cover enclosing said inflatable device and said inflator, said cover being molded from a plastic material and including a reinforcing scrim molded into said plastic material; and an electric current carrying structure operable to actuate an electrically actuatable device of the vehicle;

said structure comprising electrically conductive variable resistance material disposed on said reinforcing scrim and molded into said cover with said reinforcing scrim, the resistance of said variable resistance material being variable in response to force applied to said cover by the vehicle occupant to deform said cover;

said cover including first and second cover parts releasably interconnected by a rupturable portion of said cover;

said cover having a closed condition in which said first and second cover parts enclose said inflatable device when said inflatable device is in the deflated condition;

said cover being movable, due to the force of inflation of said inflatable device, from the closed condition to an open condition in which said rupturable portion of said cover is ruptured and said first and second cover parts are spaced apart from each other to enable inflation of said inflatable device;

said structure including first and second parts of said electrically conductive variable resistance material which are releasably interconnected by a rupturable portion of said structure;

said rupturable portion of said cover overlying said rupturable portion of said structure;

said first part of said structure being movable with said first cover part from the closed condition to the open condition and said second part of said structure being movable with said second cover part from the closed to the open condition.

4. A vehicle safety apparatus for helping to protect an occupant of a vehicle, said apparatus comprising:

an inflatable vehicle occupant protection device having a deflated condition and being inflatable into an inflated condition adjacent to the vehicle occupant;

an inflator actuatable to provide inflation fluid for inflating said inflatable device from the deflated condition to the inflated condition;

support means for supporting said inflator and said inflatable device on a portion of the vehicle;

a cover enclosing said inflatable device and said inflator, said cover being molded from a plastic material and including a reinforcing scrim molded into said plastic material; and an electric current carrying structure operable to actuate an electrically actuatable device of the vehicle;

said structure comprising electrically conductive variable resistance material disposed on said reinforcing scrim and molded into said cover with said reinforcing scrim, the resistance of said variable resistance material being variable in response to force applied to said cover by the vehicle occupant to deform said cover;

said cover including first and second cover parts releasably interconnected by a rupturable portion of said cover;

said cover having a closed condition in which said first and second cover parts enclose said inflatable device when said inflatable device is in the deflated condition;

said cover being movable, due to the force of inflation of said inflatable device, from the closed condition to an open condition in which said rupturable portion of said cover is ruptured and said first and second cover parts are spaced apart from each other to enable inflation of said inflatable device;

said structure including first and second parts which are releasably interconnected by a rupturable portion of said structure;

said rupturable portion of said cover overlying said rupturable portion of said structure;

said first part of said structure being movable with said first cover part from the closed condition to the open condition and said second part of said structure being movable with said second cover part from the closed to the open condition;

said rupturable portion of said structure comprising a series of connector sections separated by a series of slots, said connector sections extending between and interconnecting said first and second parts of said structure, a portion of said electrically conductive, variable resistance material being located on at least one of said connector sections, the resistance of said variable resistance material being variable in response to force applied to said at least one connector section by the vehicle occupant.

* * * * *